United States Patent [19]
Schubert et al.

[11] 3,934,700
[45] Jan. 27, 1976

[54] TRANSFER LINE

[75] Inventors: Paul Schubert, Kirchhein; Hans Treipl, Oschelbronn, both of Germany

[73] Assignee: Cross Europa-Werk GmbH, Wendlingen, Germany

[22] Filed: Jan. 7, 1975

[21] Appl. No.: 539,063

[30] Foreign Application Priority Data
Jan. 12, 1974 Germany............................ 2401503

[52] U.S. Cl. ...................... 198/19; 198/85; 198/106
[51] Int. Cl.² ............................................ B23Q 7/00
[58] Field of Search............ 198/19, 20 R, 221, 106, 198/219, 85

[56] References Cited
UNITED STATES PATENTS

| | | |
|---|---|---|
| 2,525,189 | 10/1950 | Thomas............................. 198/106 |
| 2,740,515 | 4/1956 | Wilson................................. 198/19 |
| 3,023,880 | 3/1962 | Gartner et al........................ 198/85 |
| 3,125,204 | 3/1964 | Loven................................... 198/19 |
| 3,323,630 | 6/1967 | Fowler et al.......................... 198/19 |
| 3,504,781 | 4/1970 | Lehmann et al...................... 198/19 |
| 3,666,076 | 5/1972 | Miller et al........................... 198/19 |
| 3,676,675 | 7/1972 | Rawsohoff et al.................... 198/85 |
| 3,811,548 | 5/1974 | Neff..................................... 198/19 |

Primary Examiner—Richard A. Schacher
Assistant Examiner—Joseph E. Valenza
Attorney, Agent, or Firm—Harness, Dickey & Pierce

[57] ABSTRACT

The invention concerns a transfer line with at least one work station for machining workpieces, which can be advanced intermittently by a timed drive, and with a substantially U-shaped return line connected at its respective ends to two transfer stations, upon which line workpieces, clamped on a workpiece-carrier, can be slidably conveyed along a slideway by a transporting device.

17 Claims, 8 Drawing Figures

TRANSFER LINE

BACKGROUND OF THE INVENTION

1. Field of the Invention

Transfer lines for machining workpieces, e.g. for the chip-removing machining of housings or the like, are often equipped with a so-called return line. This return line has the purpose of taking the workpiece-carriers, at the end of the transfer line, and carrying them back to the entry into the transfer line. Along this return line the workpieces may for their part pass again through treatment stations, in which for example the workpieces are cleaned of chips and adherent coolant or lubricant.

2. Description of the Prior Art

With the transfer lines known in practice the arrangement is such that the individual workpiece-carriers, at the end of the transfer line, are for example pushed at a transfer station by hydraulic piston drives or chain conveyors at right angles to their former direction of conveyance and onto the slideway of the return line, after which they are pushed along the slideway as far as the first corner of the return line. There the work carriers, while retaining their spatial orientation, are taken over, again for example by hydraulic pushing mechanisms or chain conveyors, which push the workpiece-carriers onward along the slideway, substantially parallel to the intermittently-moved line, until they reach the second corner. At this second corner the workpiece-carriers, again retaining their spatial orientation, are taken over by a new pushing mechanism, which brings them back by a 90° turn to the entry into the transfer line. This method of returning the workpiece-carriers requires that the individual workpiece-carriers, at both corners of the U-shaped return line must in each case be brought to a standstill, and then accelerated again at right angles to their previous direction of movement by conveying mechanism. It is thereby inevitable that the workpiece-carriers are subjected to a substantial acceleration forces, which in the case of certain workpieces brings a risk of tipping the workpiece-carrier. There is moreover a certain difficulty in braking the workpiece-carriers at their arrival at the corners of the return line, because the workpiece-carriers being pushed ahead become detached, under too rapid a braking, from their conveying element, and run away in the direction of conveyance. Furthermore, such a return line, where use is not made of square workpiece-carriers, requires slideways of different widths for the parts located between the corner-points, because the workpiece-carriers at the corners in each case retain their spatial orientation, which means that with workpiece-carriers which are not square a workpiece-carrier has to be moved endways and then sideways, or vice versa.

BRIEF SUMMARY OF THE INVENTION

The invention therefore has the fundamental objects of creating a transfer line upon whose return line the workpiece-carriers, with or without a workpiece, can be moved at a considerbly higher speed of transportation, eliminating the need for an arrangement having slideway lengths of different widths, and achieving an overall simplification of the entire return line.

For carrying out these objects, the transfer line named at the outset is characterized in that the return line has at least one endless chain conducted along the slideway by a pulling length of the chain, and the individual workpiece-carriers are in each case coupled to the chain at a first point by an entrainment means, and at a second point are conducted laterally. The invention is further characterized in that the workpiece-carriers can in each case be automatically coupled to the entrainment means of the chain at a transfer station and by a transporting mechanism.

In an advantageous form of construction the arrangement may be such that each workpiece-carrier may in each case be coupled to the entrainment means by a pin-connection or a hole-connection, whereby each workpiece-carrier is conducted laterally at the second point on the chain.

Each workpiece-carrier may advantageously have an elongated hole, aligned with the longitudinal axis in the direction of conveyance, into which hole there engages a cylindrical pin of an entrainment means.

The new transfer line is characterized by very simple construction, because only a simple driven endless chain is needed for conveying the workpiece-carriers. This chain by its entrainment means positively takes over the individual workpiece-carriers. Because the individual workpiece-carriers are in each case coupled to the chain only at a first point, while at the second point only a lateral conveyance occurs, it is ensured that the workpiece-carriers are able to follow the guidance of the chain. This means that the return line may follow any desired path, the entrained workpiece-carriers automatically altering their spatial alignment in accordance with their guidance by the chain. This ensures that the return line may at all places have the same width, independently of whether square or elongated workpiece-carriers are used. Moreover, and depending on the arrangement of the entrainment means, the workpiece-carriers may be carried along by the chain at practically any desired spacings, and it is even possible to think of certain workpiece-carriers being moved directly abutting against one another.

Because the workpiece-carriers are not brought to a standstill at the corners of the return line, then turned 90°, and then again have to be accelerated, it is possible to obtain a relatively high chain-speed, and thus a similar speed of transportation, which is a number of times higher than the maximum transport speed obtainable when the workpiece-carriers have to be braked at the corners, and then accelerated anew. Because of the high speed of transportation, the number of expensive workpiece-carriers may be correspondingly reduced, and the endless chain moreover, with a suitable design, has a very low noise level.

It should finally be mentioned that the individual workpiece-carriers, in the case of the new transfer line may on the return line for example in a washing station be moved repeatedly to and fro, forward and back that is, in order to intensify the washing process. This eliminates the long washing tunnels which were formerly often needed, while in one washing station, and even with a lower number of washing nozzles, removal of chips can be ensured.

The chain itself may at the corner points of the return line in each case be deviated by means of a sprocket-wheel. In order to obtain an enlargement of the deviating radius, it may however be advantageous to make the arrangement such that the chain, at the corner points of the return line, is deviated over two sprocket wheels at least, which are set near one another. Moreover it is advantageous for the loose length of the chain to be brought back alongside the return line and close to the slideway. Thus the arrangement may be such that, at the return line and below the endless chain, a catch-channel is disposed to catch coolant or lubricant that drips off, this channel having at its end a collection channel. For the purpose of facilitating the passing of the individual workpiece-carriers over at the transfer stations from the intermittent drive to the chain it is advantageous for the chain, in the region of the transfer station, with its length associated with the slideway, to be conducted for a certain length parallel to the direction of conveyance of the intermittent drive. For the purpose of ensuring that during the transfer of the workpiece-carrier to the chain there may be perfect coupling of the workpiece-carrier with the entrainment means of the chain, the arrangement may be such that the chain at the transfer station may be temporarily couplable with a timed rod of the timed-rod drive, and be moved by this a predetermined distance in the direction of conveyance. In this way there is ensured absolutely accurate synchronization of the chain movement with the timed-rod movement, and thus an accurate position of the chain entrainment means for the take-over operation.

The take-over arrangement itself has in an advantageous form of construction at least one vertically movable lifting plate, on which each workpiece-carrier can be conducted by the intermittent drive, and through which this workpiece-carrier, with automatic coupling of the workpiece-carrier to the entrainment means of the chain, can be lowered on this chain, whereby the lifting movement of the lifting plate is positively controlled dependent on the intermittent drive.

At the transfer station it is on occasion necessary for workpieces, which have to be machined on a number of sides, to run set differently through the work-station, e.g. twice, whereby during each run-through the machining is done at one side. In order to turn the workpiece, there have been heretofore provided, in the region of the transfer stations or along the return line, some stations for turning, which are operated by an attendant.

The new transfer line permits obtaining automatic turning of the workpieces in a simple manner. Similarly, it is also possible to consider a change in the sequence of the workpiece-carriers, which may be needed in certain applications.

In order to achieve this, the transfer line may be designed so that the workpiece-carriers along the return line may, by a suitable guidance of the chain, and while retaining their coupling with the pulling length of the chain, be turned through a predetermined angle from their position in a transfer station and/or be introduced in a different sequence into the other transfer station.

Further advantageous characteristics and properties of the new transfer line are shown by the following description of an example of construction of the subject of the invention shown in the drawings, and also given in the annexed claims.

DESCRIPTION OF THE PREFERRED EMBODIMENTS

Figure 1:
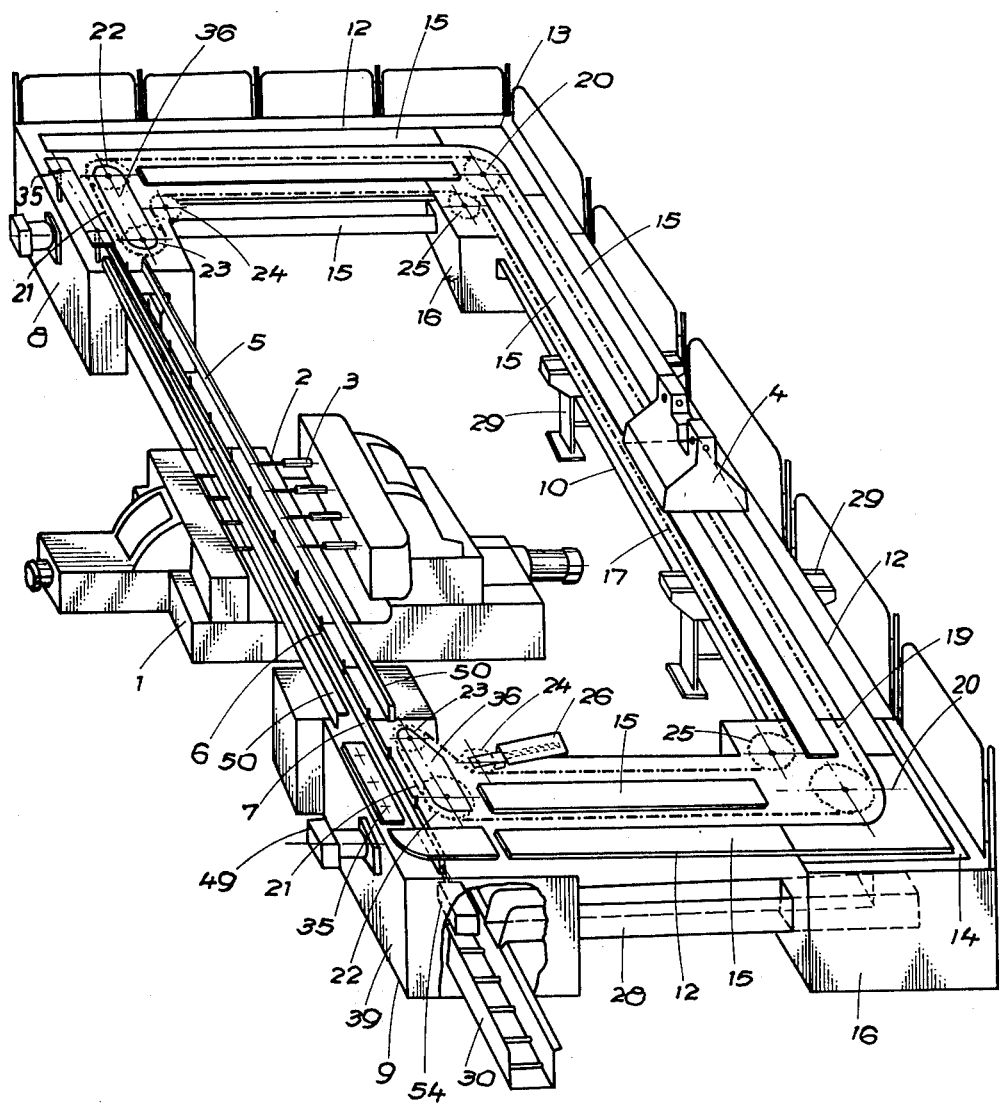
FIG. 1 shows, in a simplified perspective representation, a transfer line according to the invention.

The transfer line of FIG. 1 has a schematically indicated work-station 1, in the region of which workpieces are machined by tools 2, mounted on drive-spindles shown schematically at 3. The workpieces, not shown individually, are in each case clamped on a workpiece-carrier in the form of a carriage. The individual workpiece-carriers with their clamped-on workpieces are conveyed rhythmically or intermittently by a timed drive along a first slideway 5, whereby the arrangement, in a way known for transfer lines, is such that the workpiece-carriers 4 are held immovably at work-station 1 during the machining by the tools 2. Rhythmic drives are in themselves known in numerous forms of construction. Their special design at the work-station 1 therefore needs no description, any more than does the devices provided for fixing and clamping the workpiece-carrier 4 during the machining. It may be mentioned in this connection that reference may be made to the book "Die Bauformen der Sondermaschinen" ("The forms of construction of Special Machines"), by Dipl. -Ing. Dr. Helmut Gobel, Karl-Hamser-Verlag, 8 Munchen, 1956.

The rhythmic drive of the transfer line shown in FIG. 1 has a horizontally directed timed bar 6 which carries upwardly extending pinlike entrainment elements 7, permitting transportation of the individual workpiece-carriers 4 from an introduction station or takeover station 8, at the entry into the transfer line, as far as a pass-over station 9 at the end of the transfer line. The movement of the timed bar 6 is further explained below.

The length of the transfer line, that is the spacing between the two pass-over or transferring stations 8, 9, depends on the number of work-stations existing. For the sake of simplicity, FIG. 1 shows only one work-station 1, and one workpiece-carrier 4.

A return line 10, substantially of U-shape, is connected at the two take-over or transfer stations 8, 9 and permits the individual workpiece-carriers, after the machining operations at the work-station 1, to be brought back from the pass-over station 9 to the pass-over station 8 at the entry to the transfer line. In the region of the return line 10 there may be provided stations for the treatment of the workpieces, these being for example washing-tunnels or the like. For greater clarity, such contrivances are not shown in FIG. 1.

Figure 2:
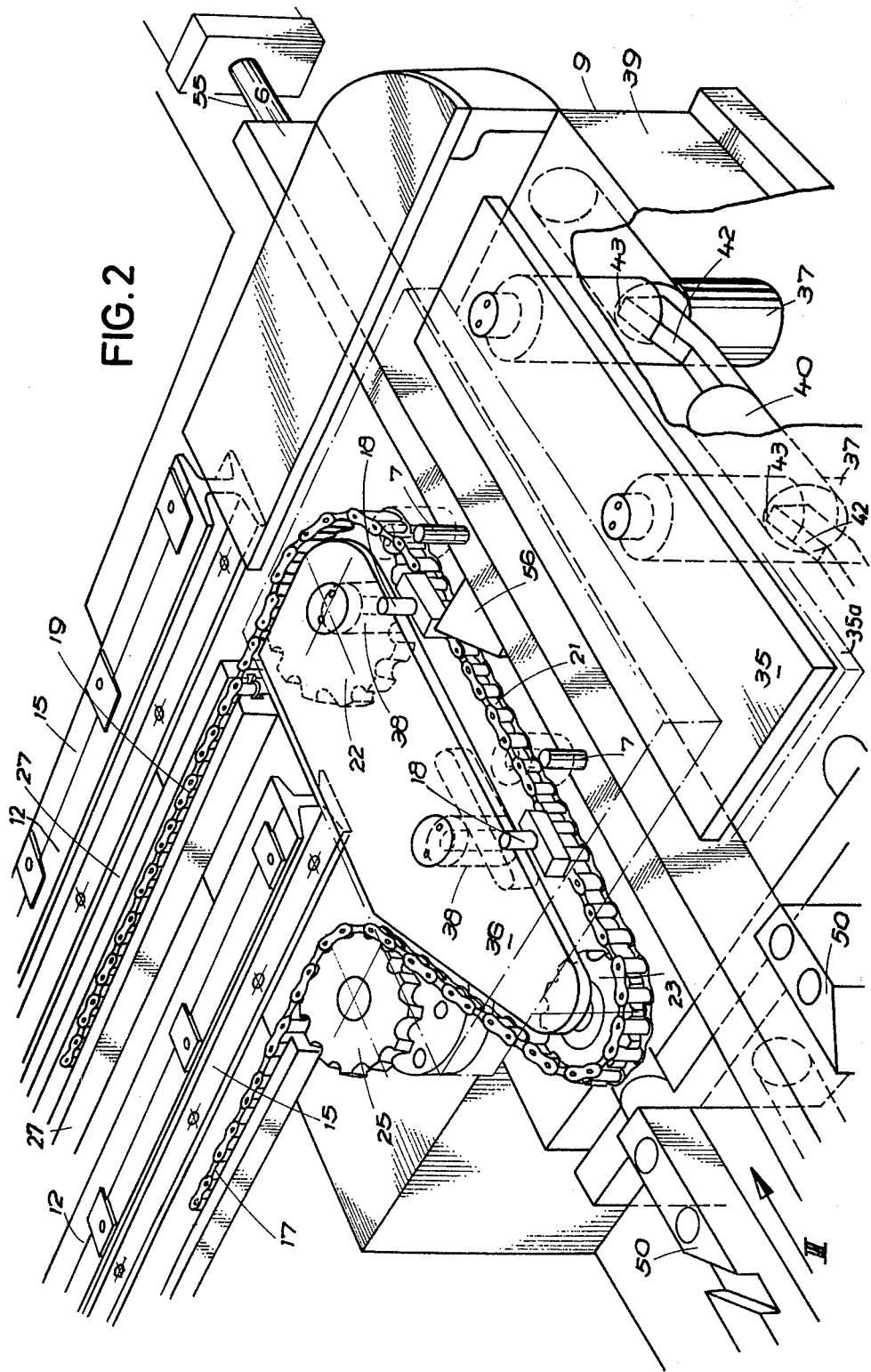
FIG. 2 shows a transfer station or passing-over station of the transfer line of FIG. 1, shown partly schematically and partly in section.

The return line 10 has a slideway 12, set horizontally and following its course, and formed, in the region between the corner points 13, 14, by two profiled rails 15 which, as can be seen from FIG. 2, are set in spaced parallel relation. The slideway 12 is supported at its corners 13, 14, in each case on a part 16 of the framework, and is connected at its ends with the pass-over or transfer stations 8, 9.

Associated with the return line 10 is a transporting mechanism, which consists of an endless chain 17, provided at predetermined spacings with pinlike entrainment means 18, of which only two are shown in FIG. 2. The endless chain 17 is conducted by its pulling length 19 intermediate the slideway 12 of the return line 10 in a manner such that the length 19 of the chain runs somewhat below the slideway 12, and the entrainment means 18 extend upward into the slideway 12 between the two rails 15 which define the slideway.

In the form of construction shown in FIGS. 1 to 4, the endless chain 17 is deviated from its length 19, at each of the corners 13, 14, 90° by means of a sprocket-wheel 20 turning on a vertical axis. In the region of the two pass-over or transfer stations 8, 9, length 19 is conducted at 21 for a certain length parallel to the rhythmic-drive conveyor. For this purpose there is provided at each pass-over or transfer station 8, 9, a deviating wheel 22 rotatable on a vertical axis and suitably spaced from a deviating wheel 23 rotatable on a parallel axis. The remaining length of the endless chain runs near the slideway 12, and is conducted over suitably disposed deviating wheels 24, 25, which are each freely rotatable. A chain tautening device, shown schematically at 26 of FIG. 1, serves for tautening the endless chain and enables the associated deviating wheel 24 to move toward or away from the chain 17, so as to vary the tautness of the chain in a known manner.

The drive of the endless chain is by a drive motor, not shown in detail, which drives one of the deviating wheels 22, by means of a suitable transmission and is disposed in the region of one of the transfer stations 8, 9.

In the region of the slideway 12 the chain length 19 is run between two guide rails 27 (FIG. 2), so that lateral deviation of this length is not possible. A catch channel 28 is set below the chain 17 and in the region of the slideway 12, and substantially follows the course of the slideway 12 and thus that of the chain-length 19. At the transfer stations 8, 9, as well as at the framework parts 16 in the corners 13, 14 and at the intermediate trestles 29, it is supported in common with the slideway 12. The catch channel 28 has its outlet in the region of the transfer station 9 and as shown in FIG. 1, leads into a continuous chip-collecting channel 30 of the transfer line, through which the chips dropping from the workstations are continuously carried away.

Figure 3:
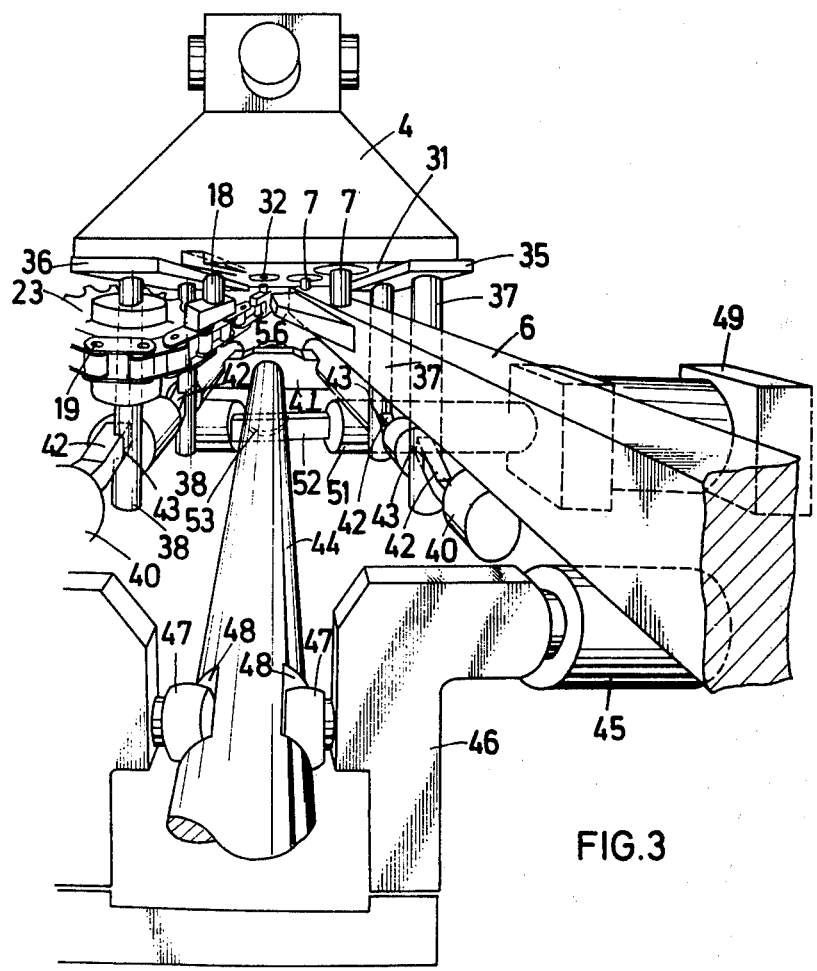
FIG. 3 shows the passing-over station of FIG. 2 in a perspective view, looking in the direction of the arrow III of FIG. 2.
Figure 4:
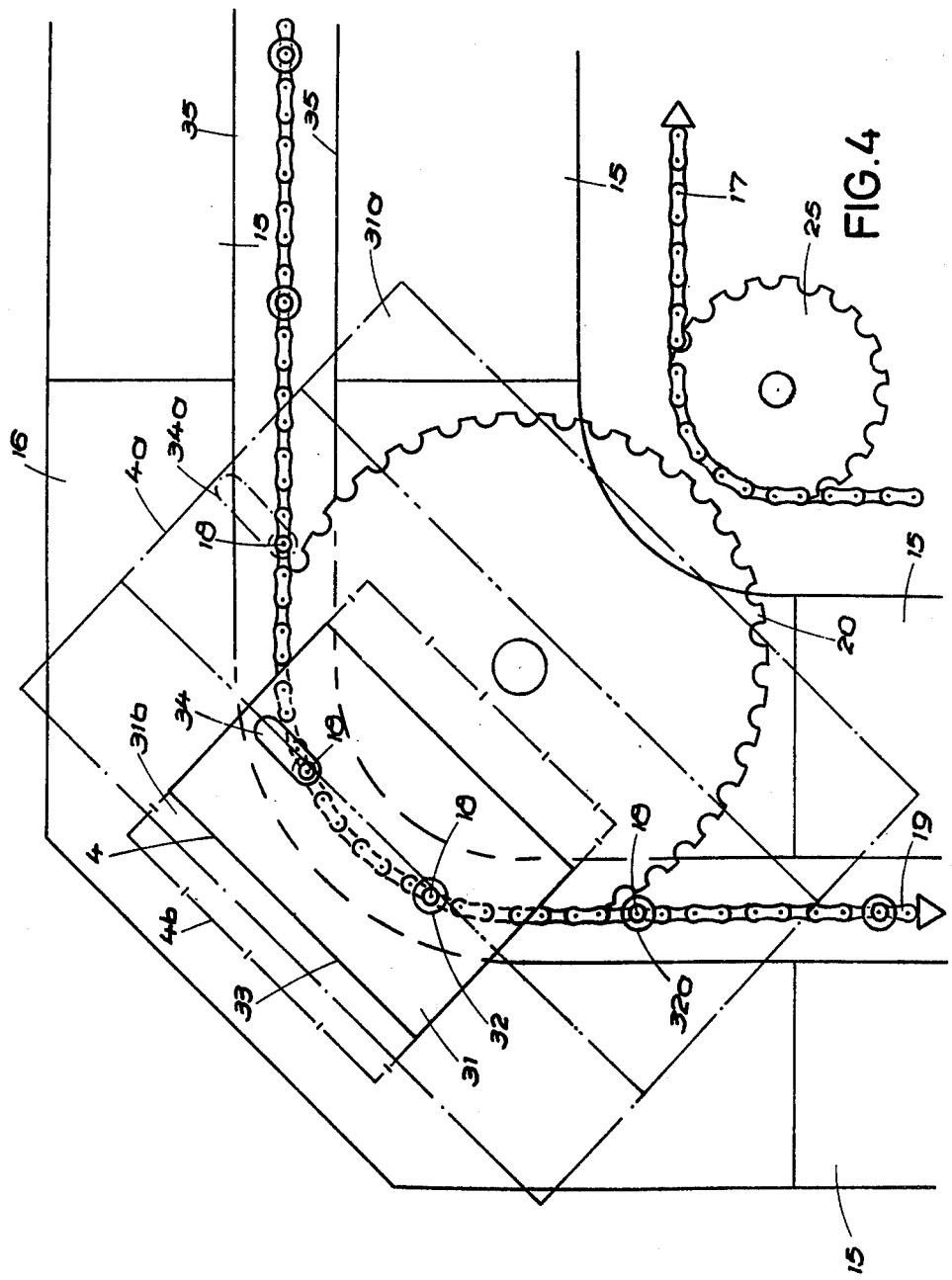
FIG. 4 shows a corner point of the transfer line of FIG. 1, in a schematic plan view.

The individual workpiece-carriers 4, formed as pallets, have a smooth sliding undersurface 31 (FIG. 3), by which they can be pushed along on the slideway 12. Each workpiece-carrier 4 can be coupled to the chain-length 19 at two link-points. For this purpose the workpiece-carrier 4 is provided with a cylindrical bore 32 made in a suitable bushing in the region of its sliding surface 31, as shown in FIG. 4, which in common with an engaging entrainment means 18 forms the first link-point of the chain-length 19, at which point a positive drive of the workpiece-carrier 4 is obtained by the chain-length 19. In the vicinity of the bore 32 and advantageously on a line running parallel to the edge 33 of the workpiece-carrier 4, an elongated hole 34 is provided in the workpiece-carrier in the region of the slide surface 31, which forms the second link-point together with an engaging entrainment means 18 of the chain-length 19. The elongated hole 34 is arranged with its longitudinal axis in the direction of conveyance; and it effects a lateral guidance of the workpiece-carrier 4 during the conveying movement. A transmission of the entrainment force from the corresponding engaged entrainment means 18 to the workpiece-carrier 4 does not occur at the second link-point; the entrainment force being transmitted only at the first link-point by means of the cylindrical hole 34.

In order to show the relationships more clearly, FIG. 4 shows only the outline of the slide surface 31 of the workpiece-carrier 4, with the associated hole 32 and the corresponding elongated hole 34.

With the illustrated form of construction the lateral guidance of the workpiece-carrier 4 at the second link-point is accomplished by the elongated hole 34 and by the corresponding entrainment means 18 directly on the chain-length 19. In a modified form of construction it is also possible to have the lateral guidance of the workpiece-carrier 4 produced for example at edges 35 which laterally define the chainlength 19 at the slideway 12 (FIG. 4). However, in this case the transmission of the entrainment-element force at the first link-point 32 is the same.

The workpiece-carriers 4 are conducted centrally by the chain-length 19, because the hole 32 and associated elongated hole 34 are in each case situated on a line running centrally of the slide surface 31 and parallel to the longitudinal edges 33. During their transportation the workpiece-carriers 4 always keep their same alignment relative to chain-length 19. When passing a corner, elongated hole 34 permits compensation for the tangential shortening of the chain in the corner. This is shown in FIG. 4. Because the workpiece-carriers during their transportation are properly guided at each corner, i.e. change their spatial alignment, the transporting movement does not need to be interrupted at corners 13, 14. The workpiece-carriers travel at uniform speed around the corners.

Moreover, the workpiece-carriers 4 are positively coupled to their associated entrainment means 18, which is a cylindrical pin engaged in cylindrical hole 32, at the first link location, so that during braking of the workpiece-carriers, e.g. on entering transfer or passover station 8, the workpiece-carriers are not able to run ahead of the decelerating chain, but remain at all times exactly coupled to it. Because the workpiece-carriers are thus towed along by the chain only at the first link point (hole 32), the result is an excellent arrangement for the motion of the workpiece-carriers 4.

As previously mentioned, the coupling of workpiece-carriers 4 with chain-length 19 at the two link points 32, 34, ensures that the workpiece-carriers always keep the same alignment relative to the chain-length 19. For this reason workpiece-carriers of different lengths and widths may be moved along without requiring any alteration of slideway. This is seen in FIG. 4, where there is shown at 4a the outline of a workpiece-carrier of substantially greater dimensions, and with its hole 32a and elongated hole 34a shown by dot-dash lines; while the outline of a square workpiece-carrier is shown by broken lines at 4b. The workpiece-carrier 4b is likewise provided at its slide-surface 31b with a cylindrical hole and an elongated hole, which in the illustration coincide with the hole 32 and the elongated hole 34.

The movement of chain 17 is moreover controlled by the indexing movement of the timed drive of the transfer line, which is done electrically by suitable signals to the electric drive-motor of chain 17. This advancing movement does not need to be in one direction; it is possible to also move the chain in oscillating fashion, e.g. in the region of the washing station, so that there is an intensification of the washing by the to-and-fro movement.

Figure 5:
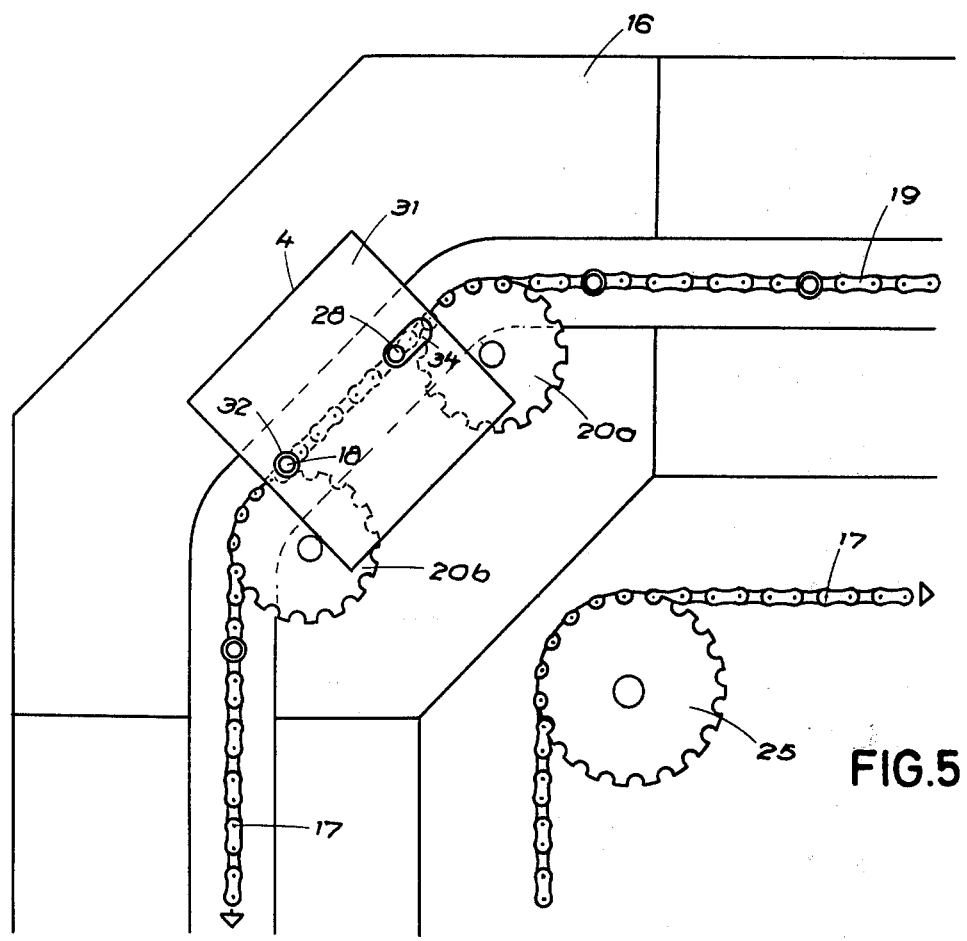
FIG. 5 shows a corner point of the return line of the transfer line of FIG. 1, in a plan view and schematically, with a modified form of construction.

In cases where, because of special conditions, the return line 10 or the size of the workpiece-carrier makes desirable a greater deviating radius in the region of corners 13, 14, the deviation of endless chain 17 in the region of the corners can be as shown in FIG. 5. Instead of one deviation radius 20 there are provided two adjacent deviation radii 20a, 20b, which sequentially provide for the deviation of the chain-length 19 in two steps.

A lifting device is provided at the transfer or passover station 9 which automatically transfers workpiece-carrier 4, brought up by the rhythmic drive, to the slideway 12, in such a way that it becomes coupled to entrainment means 18 of chain-length 19. At the other end (at transfer station 8) there is provided a corresponding transferring device, which lifts the arriving workpiece-carriers out of entrainment means 18 of chain-length 19, and transfers them again to slideway 5 where, after replacement of the machined workpiece by an unmachined piece, they are again ready for a passage through work-station 1.

The lifting device, described now in connection with the passover or transfer station 9, has two horizontal lifting plates 35, 36, set parallel to one another, and disposed on both sides of portion 21 of the chain-length 19, extending in the conveying direction of the rhythmic drive (FIG. 2). Lifting plates 35, 36 are able to move vertically between their lowered and raised positions. In their raised position they lie in the plane of slideway 5 of the transfer line. This slideway is formed by two spaced-apart slideway rails 50, between which the rhythmic-motion rod or bar 6 moves longitudinally. Each of the lifting plates 35, 36, is mounted on two lifting pistons 37 and 38 respectively, which are installed in a framework 39 of transfer station 9 so as to be able to move up and down. The lifting movement of pistons 37,38, and thus of lifting plates 35, 36, is produced by a lifting device positively synchronized with the movement of indexing bar 6.

The lifting device has two parallel drive rods 40 (FIGS. 2,3) installed so as to be movable lengthwise and horizontally in the framework part 39, and connected firmly together at their ends by a yoke 41. In the region of lifting pistons 37, 38, the two drive rods 40 are made with wedge-surfaces 42, which in their turn engage in corresponding slotlike guideways 43 in lifting pistons 37, 38. When a lengthwise movement is imparted to the drive rods 40, slotted guideways 43 of lifting pistons 37, 38, slide on wedgelike surfaces 42, so that with a movement of drive rods 40 directed to the right in FIG. 2, lifting pistons 37, 38, go downwardly until they reach the lowered position, shown at 35a by dot-dash lines; while with a movement to the left shown by solid lines in FIG. 2 they go to a raised position. The longitudinal displacement of the drive rods 40 is by means of a drive rod 44, connected to yoke 41 and extending substantially parallel to timed bar 6.

Figure 6:
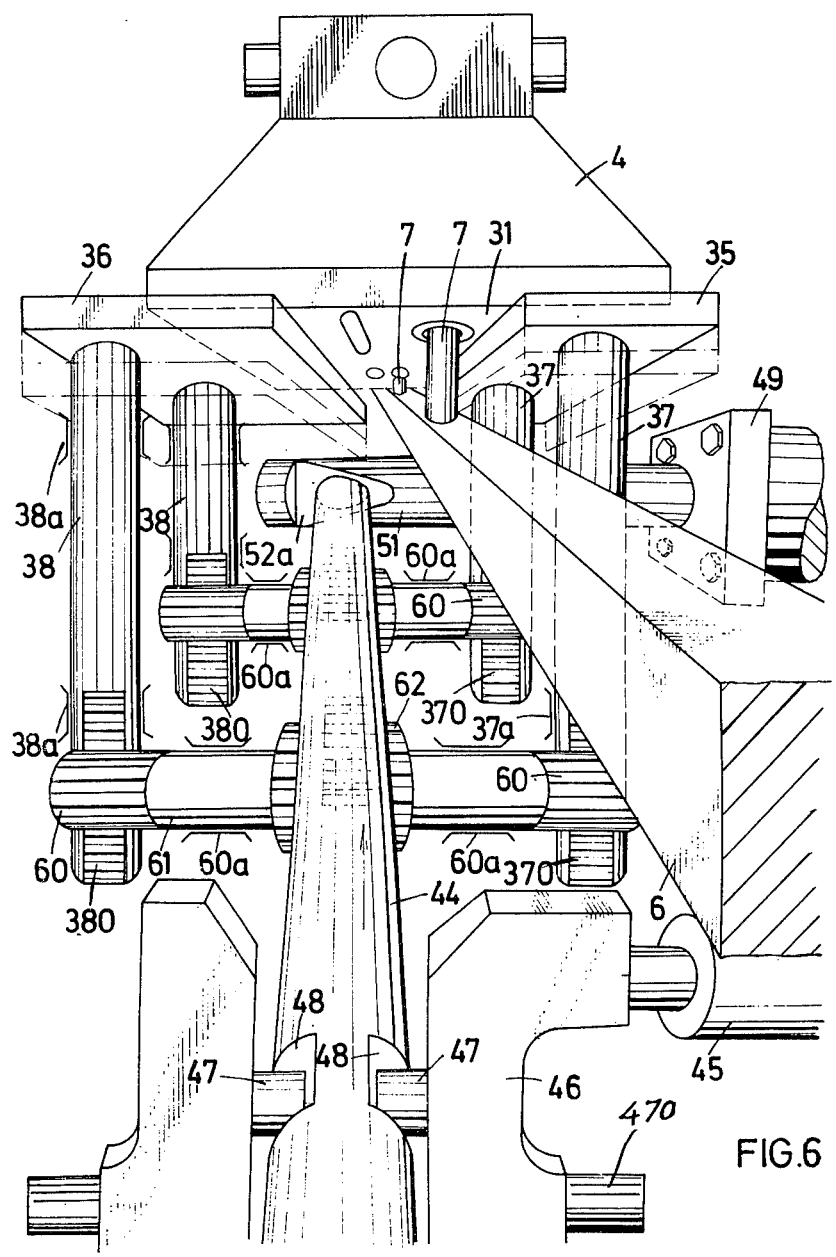
FIG. 6 shows a passing-over station of the transfer line of FIG. 1, with another form of construction, shown partly in perspective, partly schematically, and partly sectioned.

Timed bar 6, which extends between the transfer stations 8 and 9, is mounted on rollers 45 carried by rockers 46, which in their turn are each disposed to pivot about a horizontal pivot pin 470 (FIG. 6). Timed bar 6 is supported along its entire length by a corresponding number of rockers 46, only one of which is shown in FIG. 3. The individual rockers 46 are positively coupled with actuating rods 44 by cylindrical drive cams 47, which engage in corresponding recesses 48 in actuating rods 44. Thus when a lengthwise movement is imparted to actuating rods 44, all rockers 46 are pivoted in the same direction about their pivot pins 470, whereby timed bar 6 is carried by rollers moved along an arc, whose center point is situated on pivot pin 470.

The longitudinal movement of actuating rods 44 is produced by a hydraulic piston-pushing motor 49, flanged on the framework part 39 of transfer station 9, and mounted with its piston rod 51 movable longitudinally in framework part 29. Piston rid 51 is provided with a wedgelike surface 52, disposed at an acute angle, in a horizontal plane, to the longitudinal axis of piston rod 51, and it engages in a slotted guideway 53 in actuating rod 44. Thus when piston rod 51 is moved to the left in FIG. 3 by the piston of motor 49, then actuating rod 44 becomes moved to the rear in the same figure.

The timed bar 6 itself is connected with a drive arrangement, schematically shown at 54 (FIG. 1) in the form of a hydraulic pistontype motor, the connection being by a piston rod 55 which is operated depending on the operating cycle of the work-station 1. Furthermore, the timed bar in the vicinity of the transfer station is provided with an entrainment means 56, which extends into the path of movement of entrainment means 18 of chain-length 19, enabling the entrainment means 18, with which it is in engagement, to advance a certain distance.

The take-over or transfer arrangement described thus far operates as follows:

Workpiece-carriers 4, which are situated on slideway 5 and carry workpieces that are to be machined in work-station 1 or already been machined in it, are coupled with timed bar 6 in that the associated drivers 7 of bar 6 engage in corresponding holes in the region of slide-surface 31 of workpiece-carrier 4. Through suitable operation of the pushing-piston motor 54 it is ensured that timed bar 6 becomes moved to the right in FIG. 1. Thus a workpiece-carrier is brought to the pass-over or transfer station 9, and upon the two lifting plates 35, 36, situated in their raised position. During this forward movement of the timed bar 6 the entrainment nose 56, comes into engagement with an entrainment means 18 of chain-length 19, in the manner shown in FIG. 2, so that chain 17 moves with it a certain amount. At the end of the longitudinal movement of timed bar 6, entrainment means 18 on the portion 21 of chain 17 parallel to timed bar 6 is situated positively in an exact location with respect to timed bar 6 and particularly driver 7 of timed bar 6. The drive of chain 17 is switched off during this small further movement effected by the drive-nose 56, so that chain 17 can be carried along by drive-nose 56 unhindered. When timed bar 6 has in the course of this movement reached its end position, push-piston motor 49 is operated, and advances its piston-rod 51 to the left in FIG. 3, the result of which is that actuating bar 44 moves backward in FIG. 3 in the manner previously described. Consequently drive-rods 40 are moved rearwardly through yoke 46, which has the result that the lifting pistons 37, 38, together with the lifting plates 35, 36, move downwardly, while at the same time rockers 46 become pivoted to the rear in FIG. 3 about their pivot pins 470. As a result of this pivoting movement of rockers 46 rollers 46, supporting the timed bar 6, swing arcuately downwardly about pivot-pins 470, so that timed bar 6, simultaneously with the lowering of lifting pistons 37, 38, and lifting plates 35, 36, becomes lowered a double amount. With this lowering movement the workpiece-carrier, in the manner shown in FIG. 3, becomes lowered onto chain-length 19 in the region of its portion 21, whereby the pinlike entrainment means 18 engages in hole 32 and elongated hole 34 of workpiece-carrier 4, while driver 7 of bar is brought out of engagement with its associated hole in the workpiece-carrier 4, because the lowering movement is doubled. Because chain entrainment means 18 become positively carried along by driver nose 56 during the advance of bar 6 for a part of their travel, it is ensured that during the lowering of the workpiece-carrier 4 chain entrainment means 18 are exactly aligned with hole 32 and associated elongated hole 34 of workpiece-carrier 4. When lifting plates 35, 36 are completely lowered and brought into the position 35a of FIG. 2, and driver 7 of bar 6 is completely out of engagement with the workpiece-carrier 4, then there is transmitted to the drive of endless chain 17 a switch-on signal, as a result of which workpiece-carrier 4 is carried along by chain's entrainment means 18 in engagement with it, and becomes transported along return line 10 upon the slideway 12. This is easily possible because lifting plates 35, 36 in their lowered position of 35a exactly at the level of slideway 12, which is somewhat lower than slideway 5.

When the workpiece-carrier 4 has left the transfer station 9, motor 54 is operated in the reverse direction, so that the timed bar 6 in its lowered position of FIG. 2 becomes moved one timed stroke farther to the left. Then motor 49 is switched on, and pulls its piston rod 51 back again, the result of which is that actuating bar 44 becomes moved forward in FIG. 3. This has the result that lifting pistons 37, 38, together with lifting plates 35, 36, become raised again to the level of slideway 5, while at the same time rockers 46 swing back round their pivot axes 470, so that rollers 45 go upward on their arcuate path, and bar 6 moves up again. Upon this upward movement bar 6 with its drivers 7 comes again into engagement with workpiece-carriers 4 set down on slideway 5, so that at the following advance of bar 6 to the right in FIG. 2, the next work-carrier can be brought into the pass-over or transfer station 9 in the manner already described.

The lifting arrangement installed at transfer station 8 at the entry to the transfer line works in a similar way, so that there is no need to repeat the description. The workpiece-carriers 4 are brought in succession into the pass-over or transfer station 8 by the chain-length 19, at which station the first workpiece-carrier 4 is set onto lifting plates 35, 36, which are in each case in their lowered position. Lifting-plates 35, 36, which are operated similarly to transfer station 9 by the lifting pistons 37, 38, and drive rods 40, as well as actuating bars 44, lift workpiece-carrier 4 to the level of slideway 5, so that upon the previously described lifting movement of timed bar 6, its driver 7 comes into engagement with workpiece-carrier situated at the time at transfer station 8, while workpiece-carrier 4 becomes lifted out of the chain entrainment means 18. Upon the advance toward the right in FIG. 2 of the lifted bar 6 in the course of the timed lift, the workpiece-carrier situated at transfer station 8 is moved again in a direction toward work-station 1.

FIG. 6 shows an alternative form of construction of the pass-over or transfer device which may be provided at stations 8 and 9. Because this arrangement corresponds in principle to that described relative to FIGS. 2 and 3, similar parts are provided with the same reference numerals.

The lifting device shown in FIG. 6 likewise has two horizontal lifting plates 35, 36, set parallel to one another and disposed on both sides of the part of the towing length of chain and parallel with the direction of conveyance of the rhythmic drive. For greater clarity in FIG. 6, the towing length is not shown; it is similar to what is shown in FIG. 3.

Lifting plates 35, 36 are each disposed on lifting pistons 37 and 38 respectively, which in their turn are able to move upward and downward at 37a and 37b in a part of the housing which is not shown. Lifting pistons 37, 38, are formed as racks at their lower ends 370 and 380. The teeth of the pair of racks 370, 380 engage pinions 60, mounted in pairs on horizontal shafts 61, and are in their turn able to turn in bearings 60a in the housing (not shown). Each shaft 61 is fastened to a drive gear wheel 62, both gear wheels 62 (FIG. 6) in their turn meshing with corresponding teeth of actuating bar 44 substantially parallel to timed bar 6.

The longitudinal movement of actuating bar 44 is again produced by hydraulic piston-type motor 49, which is flanged onto the frame part of the transfer station 9, and installed with its piston rod 51 movable longitudinally in the frame part. Piston rod 51 is made with a wedgelike surface 52a, upon which the actuating bar 44 is supported by its corresponding face. When the piston rod 51 is pushed forward to the left in FIG. 6, actuating bar 44 is moved forward in the same figure, while with a movement of piston rod 51 toward the right actuating bar 44 is driven in the direction shown by the arrow.

The transferring arrangement shown in FIG. 6 works fundamentally in the same way as that of FIGS. 2 and 3, so that it is unnecessary to repeat the description. With this transfer arrangement, moreover, actuated bar 6 is operated by motor 54 shown in FIG. 1. With this design it also carries a drive nose corresponding to drive nose 56 of FIG. 2, which however in FIG. 6, like the associated chain, is omitted for greater clarity.

With the transfer line of FIG. 1 workpiece-carriers 4 are advanced on return line 10 so that they have the same spatial alignment at transfer station 8, in going over to slideway 5, as when leaving slideway 5 in the region of the other transfer station 9.

Figure 7:
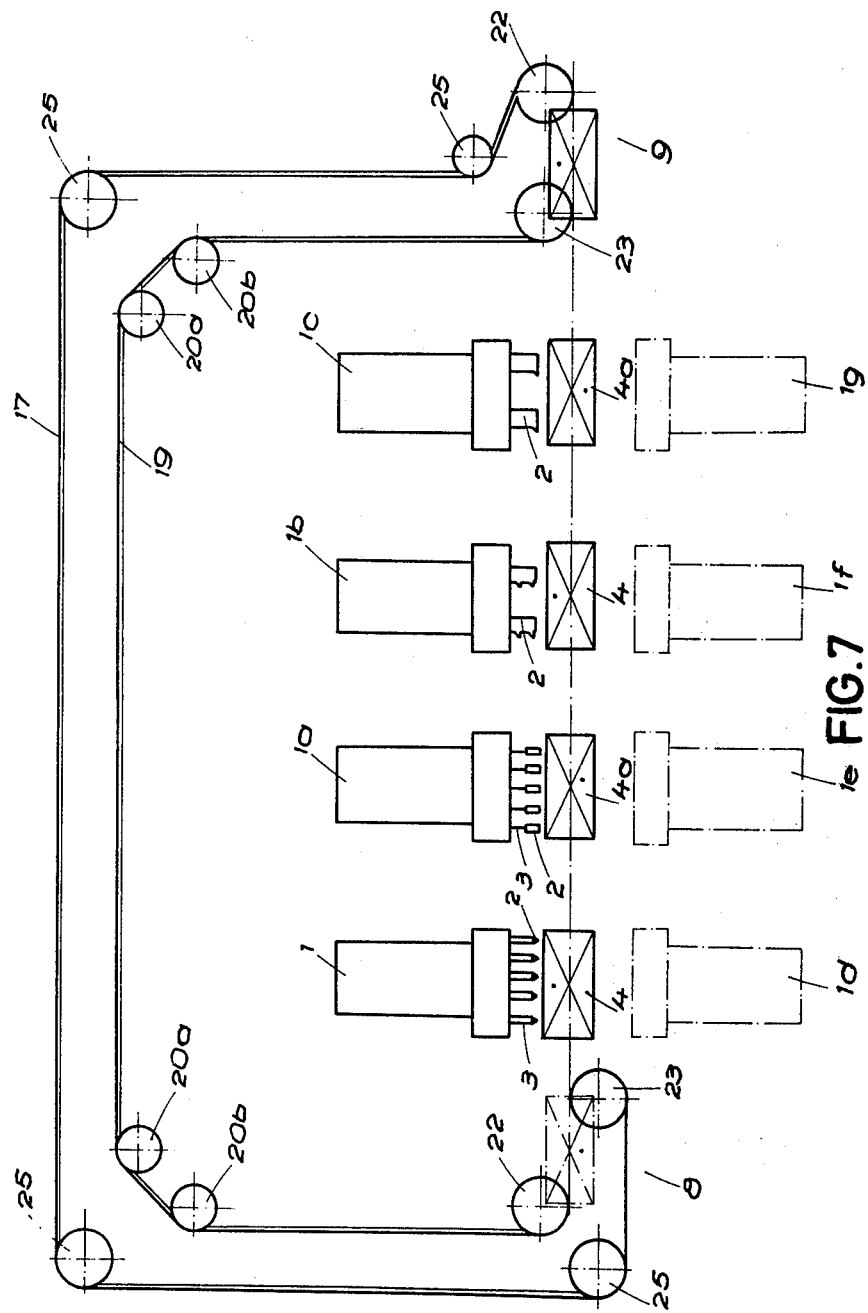
FIG. 7 shows a transfer line according to the invention in another form of construction, showing it in a simplified form of representation and in plan view.

In the case of certain workpieces, which for example have to be machined on a number of sides, or which have to undergo a number of machining operations, it may be necessary to turn the workpiece, e.g. 180°, into another position and to send it once more through the work station to effect the additional machining operation. The return line 10 may now be made so that, through suitable guidance of chain 17 and its towing length 19, the workpiece may be turned some 180° during travel between transfer station 9 and transfer station 8. FIG. 7 shows one example of construction of such a transfer line.

In this case endless chain 17 is, as shown in FIG. 7, deviated by deviating-wheels 20a, 20b, 22, 23, 25, in such a way that towing chain-length 19, in the region of the two transfer stations 8, 9, at 21 and 21a respectively, is for a certain length guided parallel to the direction of timed drive. Here the two deviating wheels 23, 35 at transfer station 8 are situated at the right-hand side on slideway 5, shown schematically by its centerline, while deviating wheels 23, 22 of the other transfer station 9, looking in the same direction, are situated to the left of slideway 5.

The individual workpiece-carriers 4a are, in the manner described with respect to FIG. 1, coupled at transfer station 9 individually to the towing-length 19 of chain 17. During the actual transferring operation, chain 17 is uncoupled from its drive, as already described, and is carried along by the nose 56 of timed bar 6 (see FIGS. 2 and 3) for a certain distance, for the purpose of thereby obtaining exact engagement of entrainment means 18 into cylindrical hole 32 or elongated hole 34 of the workpiece-carrier 4 or 4a concerned. After the coupling of a workpiece-carrier 4, 4a, with the towing chain-length 19 of chain 17 in the direction of movement, workpiece-carrier 4, 4a becomes transported out of the transfer station 9 to the other transport station 8, so that the workpiece-carrier 4 or 4a concerned, because of the special guidance of towing length 19, makes a 180° turn, and at transfer station 8 it is given over to slideway 5 turned accordingly.

Therefore while workpiece-carrier 4 or 4a with the workpiece it is carrying becomes machined on one side during its first passage through the work stations shown at 1a to 1g, at the second passage there is machining on another side. In this way, with a saving of work stations obtained, it is possible during a first passage to do certain machining operations on one side, and at a second passage on another side. On the other hand it is also possible to imagine for example that the work stations 1d to 1e shown by dot-dash lines in FIG. 7 are retained for subsequent use, so that the workpieces are in the first place machined on both sides at the already-existing work stations 1 to 1c.

Figure 8:
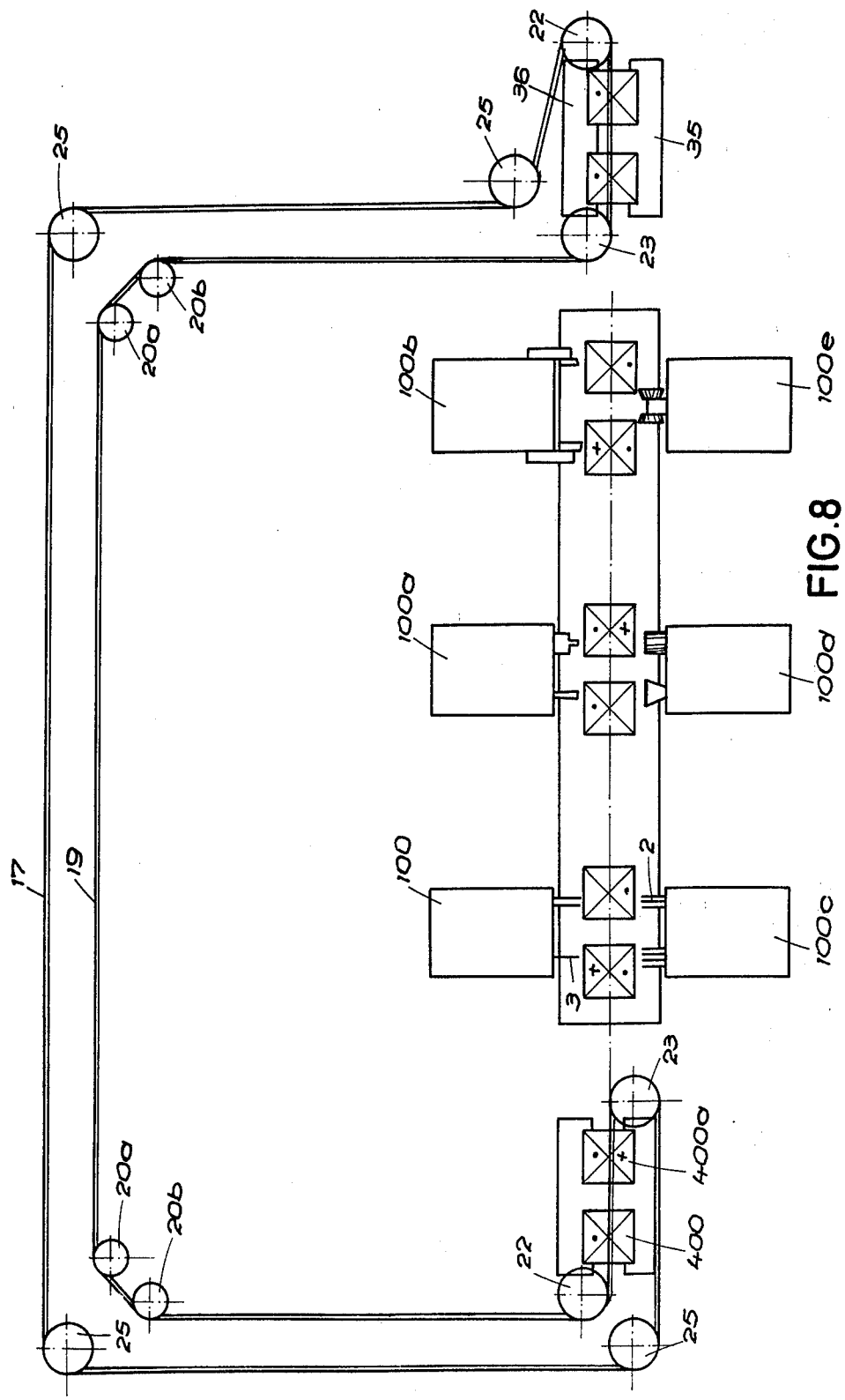
FIG. 8 shows a transfer line according to the invention in a further form of construction, showing it in a simplified representation and in plan view.

The fundamentally similar run of chain 17 and its towing length 19, in the manner shown in FIG. 8, can also be used to obtain an automatic change of sequence, in that the workpiece-carriers 400 or 400a respectively are sent through the work stations shown at 100 to 100e in FIG. 8. The workpieces 400 and 400a are always associated with one another in pairs, as shown in FIG. 8.

It is moreover possible to imagine, by a suitable running of the towing length 19, a turning of the workpiece 90° or some other suitable angle.

The parts of the return line shown in FIG. 8 corresponds to the similar parts of FIG. 7, so they are given the same reference numerals. A new description can be dispensed with.

What is claimed is:

1. In a transfer line of the type having at least one work station for machining workpieces, which can be moved onward rhythmically by a timed drive having a transporting device, and with a substantially U-shaped return line connected at its respective ends to two transfer stations, upon which line workpieces, clamped on a workpiece-carrier, can be slidingly conveyed along a slideway by said transporting device, at least one endless chain on said return line having a pulling length extending along said slideway, entrainment means for coupling the individual workpiece-carriers to the chain at a first point and at a second point, means at the second point permitting relative movement between the chain and carrier, and a transferring mechanism at each transfer station for automatically coupling or uncoupling the chain and carrier.

2. A transfer device according to claim 1, the coupling means at said points comprising pin-and-hole connections.

3. A transfer device according to claim 1, the coupling means at said second point performing relative lateral guidance between the chain and carrier.

4. A transfer device according to claim 3, the coupling means at said points comprising pin-and-hole connections, the hole of said second connection being a slot in each carrier with its axis extending in the direction of movement of the carrier, in which a cylindrical pin is engaged.

5. A transfer device according to claim 1, further provided with sprocket wheels at the ends of the center leg of said return line for deviating said chain.

6. A transfer device according to claim 1, further provided with at least two adjacent sprocket wheels at each end of the center leg of said return line for deviating said chain.

7. A transfer line according to claim 1, said pulling length of the chain being disposed within said slideway, the chain having a non-pulling length parallel to but to one side of said slideway, the chain being slightly below said slideway plane.

8. A transfer line according to claim 7, further provided with a receiving chute below one leg of said return line, and a collection chute at the mouth of said receiving chute.

9. A transfer line according to claim 1, said pulling length of the chain having a portion in the area of each of said transfer stations which extends parallel to said transporting device for a predetermined distance.

10. A transfer device according to claim 9, said transporting device comprising reciprocable bar, and means for temporarily coupling said bar to said portion of the chain and thereby moving said chain portion a predetermined distance in the direction of movement of the bar.

11. A transfer device according to claim 1, each of said transferring mechanisms comprising at least one vertically movable lifting plate over which a carrier is movable by said transporting device, whereby lowering of said plate will cause a carrier to be coupled to said chain by said entrainment means, means for raising and lowering said transporting device and lifting plate, and means synchronizing the vertical movement of said transporting device and lifting plate.

12. A transfer line according to claim 11, said means for raising and lowering the lifting plate comprising a horizontally reciprocable drive rod, and a second drive rod parallel to said transporting device for actuating said first drive rod.

13. A transfer device according to claim 12, said synchronizing means comprising movable supporting means along the length of said transporting device connected to said second drive bar and responsive to reciprocation thereof to raise and lower said transporting device, whereby a carrier may be coupled to or uncoupled from said transport device.

14. A transfer device according to claim 13, said lifting plate being vertically movable half the distance of said transporting bar.

15. A transfer device according to claim 13, further provided with means interconnecting the lifting plate raising and lowering means at said two transfer stations, whereby the lifting plates at the two transfer stations will move in opposite directions.

16. A transfer line according to claim 11, said means for raising and lowering said lifting plate comprising at least one driving gear and meshing rack, and a drive rod extending parallel to said transporting device for actuating said gear.

17. A transfer device according to claim 1, further provided with means at said transferring station for reversing the orientation of said carriers in their direction of movement for each successive passage along said slideway.

* * * * *

UNITED STATES PATENT AND TRADEMARK OFFICE
CERTIFICATE OF CORRECTION

PATENT NO. : 3,934,700
DATED : January 27, 1976
INVENTOR(S) : Paul Schubert et al It is certified that error appears in the above-identified patent and that said Letters Patent are hereby corrected as shown below:

Column 1, line 39, after "by" insert --the--; line 41, change "to a substantial" to --to substantial--. Column 9, line 15, change "bar is" to --bar 6 is--.

Signed and Sealed this sixth Day of April 1976

[SEAL]

Attest:

RUTH C. MASON
*Attesting Officer*

C. MARSHALL DANN
*Commissioner of Patents and Trademarks*